United States Patent
Ladru et al.

(10) Patent No.: US 8,980,372 B2
(45) Date of Patent: Mar. 17, 2015

(54) PROCESS FOR COATING A COMPONENT HAVING PARTIALLY CLOSED HOLES AND PROCESS FOR OPENING THE HOLES

(75) Inventors: Francis-Jurjen Ladru, Berlin (DE); Andrea Massa, Berlin (DE); Torsten Melzer-Jokisch, Neuenhagen bei Berlin (DE); Ralf Motzkus, Berlin (DE); Andreas Oppert, Falkensee (DE); Dimitrios Thomaidis, Berlin (DE)

(73) Assignee: Siemens Aktiengesellschaft, München (DE)

( * ) Notice: Subject to any disclaimer, the term of this patent is extended or adjusted under 35 U.S.C. 154(b) by 562 days.

(21) Appl. No.: 12/944,002

(22) Filed: Nov. 11, 2010

(65) Prior Publication Data

US 2011/0117278 A1 May 19, 2011

(30) Foreign Application Priority Data

Nov. 16, 2009 (EP) .................................... 09014306

(51) Int. Cl.
*C23C 4/02* (2006.01)
*C23C 4/18* (2006.01)
*C23C 28/00* (2006.01)
*F01D 5/18* (2006.01)
*F01D 5/28* (2006.01)

(52) U.S. Cl.
CPC ... *C23C 4/02* (2013.01); *C23C 4/18* (2013.01); *C23C 28/00* (2013.01); *F01D 5/186* (2013.01); *F01D 5/288* (2013.01); *Y02T 50/67* (2013.01); *Y02T 50/676* (2013.01); *F05D 2260/202* (2013.01)

USPC ................ 427/259; 427/8; 427/270; 427/278

(58) Field of Classification Search
CPC .................................. F01D 5/186; F01D 5/187
USPC ............................................................ 427/259
See application file for complete search history.

(56) References Cited

U.S. PATENT DOCUMENTS

| 6,024,792 A | 2/2000 | Kurz et al. |
| 2008/0226871 A1* | 9/2008 | Klein ............................ 428/138 |
| 2009/0220349 A1* | 9/2009 | Bolms et al. ................ 416/97 R |

FOREIGN PATENT DOCUMENTS

| CN | 1617772 A | 5/2005 |
| CN | 1986888 A | 6/2007 |
| EP | 0412397 B1 | 2/1991 |
| EP | 0486489 B1 | 5/1992 |
| EP | 0786017 B1 | 7/1997 |
| EP | 0892090 A1 | 1/1999 |
| EP | 1306454 A1 | 5/2003 |
| EP | 1319729 A1 | 6/2003 |
| EP | 1204776 B1 | 6/2004 |
| EP | 1510283 A1 | 3/2005 |
| EP | 1669545 A1 | 6/2006 |
| EP | 1767743 A1 | 3/2007 |
| JP | H04236757 A | 8/1992 |
| JP | H09136260 A | 5/1997 |
| JP | 2003172102 A | 6/2003 |

(Continued)

*Primary Examiner* — Alex A Rolland

(57) ABSTRACT

During the coating of a component including cooling-air holes, it is necessary, when remachining the coated cooling-air holes, to determine the correct alignment of the cooling-air row. A process is provided in that at least two cooling-air holes are kept clear by a masking material during the coating and the alignment of the cooling-air row is effected on the basis of these two unclosed cooling-air hole.

2 Claims, 4 Drawing Sheets

(56) References Cited

FOREIGN PATENT DOCUMENTS

| | | | |
|---|---|---|---|
| JP | 2005522633 | A | 7/2005 |
| JP | 2009510302 | A | 3/2009 |
| WO | WO 9987435 | A1 | 12/1999 |
| WO | WO 0044949 | A1 | 8/2000 |

* cited by examiner

FIG 10

| Material | Chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-based investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | 0.10 |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

PROCESS FOR COATING A COMPONENT HAVING PARTIALLY CLOSED HOLES AND PROCESS FOR OPENING THE HOLES

CROSS REFERENCE TO RELATED APPLICATIONS

This application claims priority of European Patent Office application No. 09014306.6 EP filed Nov. 16, 2009, which is incorporated by reference herein in its entirety.

FIELD OF INVENTION

The invention relates to a process for coating a component which has holes, wherein not all the holes are closed during the coating, and to a process for opening said holes.

BACKGROUND OF INVENTION

Components such as, for example, turbine blades or vanes of a gas turbine have cooling-air bores. Cooling-air bores of this type are made directly in the substrate before the further application of layers during the production of new components, or are already present in a component to be refurbished, in the case of which the coatings are replaced. Both cases are subject to the problem of "coat down", i.e. the coating material penetrates into the cooling-air bores and undesirably closes them.

There are processes for closing the cooling-air bores where complete coverage, in particular also during the coating process, is not always ensured.

The subsequent removal of the "coat down" from the cooling-air bores is subject to the problem of correct alignment of the cooling-air row in the apparatus by means of which the coating is removed from the cooling-air bores, since the alignment differs from a desired geometry.

SUMMARY OF INVENTION

It is therefore an object of the invention to solve the above-mentioned problem.

The object is achieved by a process as claimed in the claims and by a process as claimed in the claims.

The dependent claims list further advantageous measures which can be combined with one another, as desired, in order to obtain further advantages.

BRIEF DESCRIPTION OF THE DRAWINGS

FIG. 10 shows a list of superalloys.

The drawings and the description which follows represent only exemplary embodiments of the invention.

DETAILED DESCRIPTION OF INVENTION

Figure 1:
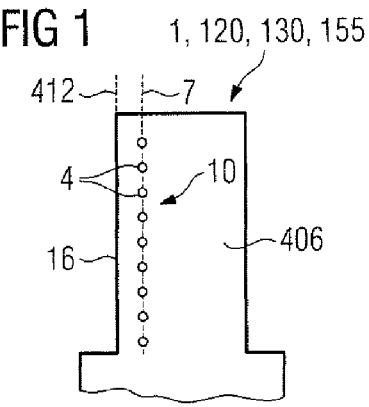
FIG. 1 shows a component having a row of cooling-air bores.
Figure 2:
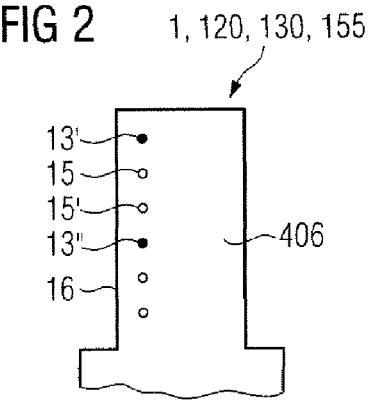
FIGS. 2, 3, 4, 5, 6 show components for the coating process according to the invention.

FIG. 1 shows a component 1, 120, 130, 155 which, as an example of holes, has cooling-air bores 4 (FIG. 1), 13', 13", . . . , 15', 15" (FIGS. 2-4) in a cooling-air row or row 10 of holes.

Figure 5:
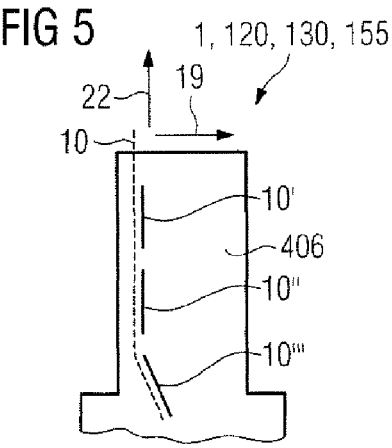

The component 120, 130, 155 may have a plurality of such cooling-air rows 10', 10", 10''' (FIG. 5).

A cooling-air row runs along a straight line (FIG. 1) or a slightly bent straight line (FIG. 5) or has a non-curved profile (not shown).

By way of example, the component 1 in this case is a turbine blade or vane 120, 130 of a gas turbine 100 (FIG. 7), the base material (substrate) of which contains a superalloy, in particular a nickel-based superalloy (FIG. 10).

The main blade or vane part 406 of the component 120, 130 has at least one row 10, 10', 10", . . . of cooling-air holes 4, 13', 13", 15', 15".

In FIG. 1, only one cooling-air row 10 is shown (non-limiting).

The cooling-air holes 4 in the cooling-air row 10 lie on a line 7, in particular a straight line 7, which is at a specific distance from the trailing or leading edge 412, 409, or the holes 4 are aligned specifically with respect to one another.

During the production of the holes 4 for producing the cooling-air row 10 in the component 1, 120, 130, 155, undesired displacement of the dashed lines 412, 7 in relation to one another can occur. This is tolerated and represents no limitation whatsoever for the first use of the component 120, 130.

If, however, material has to be removed from the cooling-air holes 4, for example during recoating or during refurbishment, the machining system, in particular that of a laser, assumes that line 412 and line 7 are ideally aligned.

Since this is sometimes not the case, the machining system has to be reprogrammed in order to take the real situation into consideration.

This is done by virtue of the fact that at least two cooling-air holes 13', 13", . . . in a cooling-air row 10 of cooling-air holes 4 are masked and closed before the coating. This can be effected in various ways, as described in the prior art.

In this case, it is preferable for up to 50%, in particular up to 40%, of the cooling-air holes to be closed.

The substrate 4 is then coated. This coating may be a metallic bonding layer (in particular MCrAlY) or a metallic bonding layer and a ceramic layer on top of the latter or only a single-ply, two-ply or multi-ply ceramic layer.

Irrespective of whether one layer or two layers are applied, the unclosed cooling-air bores 15', 15" are coated and at least partially or completely closed. This coating material in the holes 15', 15" has to be removed after the coating process. However, the previously closed cooling-air holes 13', 13" have no or scarcely any coating material within the holes and do not have to be remachined.

Before the remachining of the closed cooling-air bores 15', 15", . . . , the masking material is removed from the cooling-air bores 13', 13", . . . , in particular these bores are opened manually. An imaginary straight line 7 is then placed through the uncoated cooling holes. The machining system (not shown in more detail) detects the unclosed holes 13', 13" and is aligned with respect to a line 7 between the cooling-air bores 13', 13''', such that the machining system or, in particular, the laser knows how the line 7 of the cooling-air row 10 is defined independently with respect to the alignment of the line 412.

Figure 3:
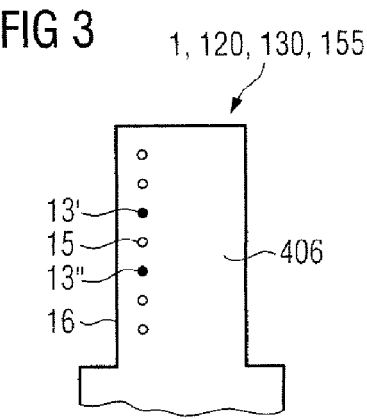
Figure 4:
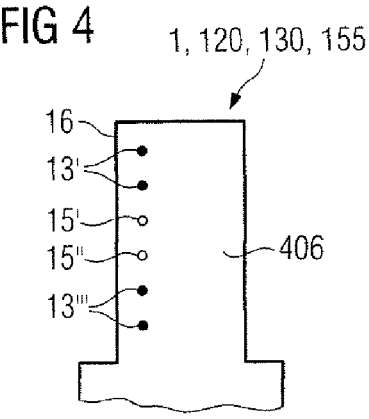

Therefore, it is always necessary to close and reopen at least two cooling-air bores 13', 13", so that a line 7 or a line with a known profile (length, angle of curvature) can be formed. It is immaterial which cooling-air holes are closed. These can be an upper and a central cooling-air hole or the topmost and bottommost cooling-air holes (FIG. 4), or these can be two central cooling-air holes (FIG. 3).

Figure 6:
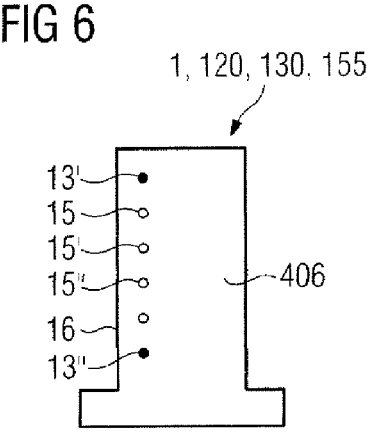

These are preferably the topmost and the bottommost holes (FIG. 6).

At least one cooling-air hole 15', 15", in particular at least a plurality of unclosed cooling-air holes 15', 15", is or are preferably present between the at least two closed cooling-air holes 13', 13".

It is likewise possible for two adjacent cooling-air bores 13', 13" to be closed, where a number of unclosed cooling-air bores 15', 15" then follows in the row 10 and then, in turn, one or two masked cooling-air bores 13', 13", which are closed before the coating.

FIG. 5 shows a further exemplary embodiment of the invention.

In this case, a cooling-air row 10 consists of a plurality of cooling-air portions 10', 10", 10''', which are aligned differently with respect to the leading edge 409 or lie on a straight line and have different properties with respect to their diffuser geometry (each portion is virtually a cooling-air row). It is thus also possible, for example, for portions 10', 10", 10''' to be present on a preferably straight line 10, in which case the cooling-air hole in the respective portion 10', 10", 10''' has a different size or a different orientation/diffuser geometry with respect to the overflow direction 19 or longitudinal axis 22 of the main blade or vane part 406.

For the preparation for the coating, a comparable situation applies to the procedure according to FIG. 2, 3, 4 or 6, i.e. here the respective pattern and specifications of FIG. 2, 3, 4 or 6 are employed for each portion 10', 10", 10''', i.e. at least two cooling-air holes 13', 13" of a portion 10', 10", 10''' are closed, and are then opened after the coating.

Within a cooling-air portion 10', 10", 10''', the cooling-air holes 4 are preferably identical. The cooling-air portions 10', 10", 10''' virtually represent a cooling-air row.

Figure 7:
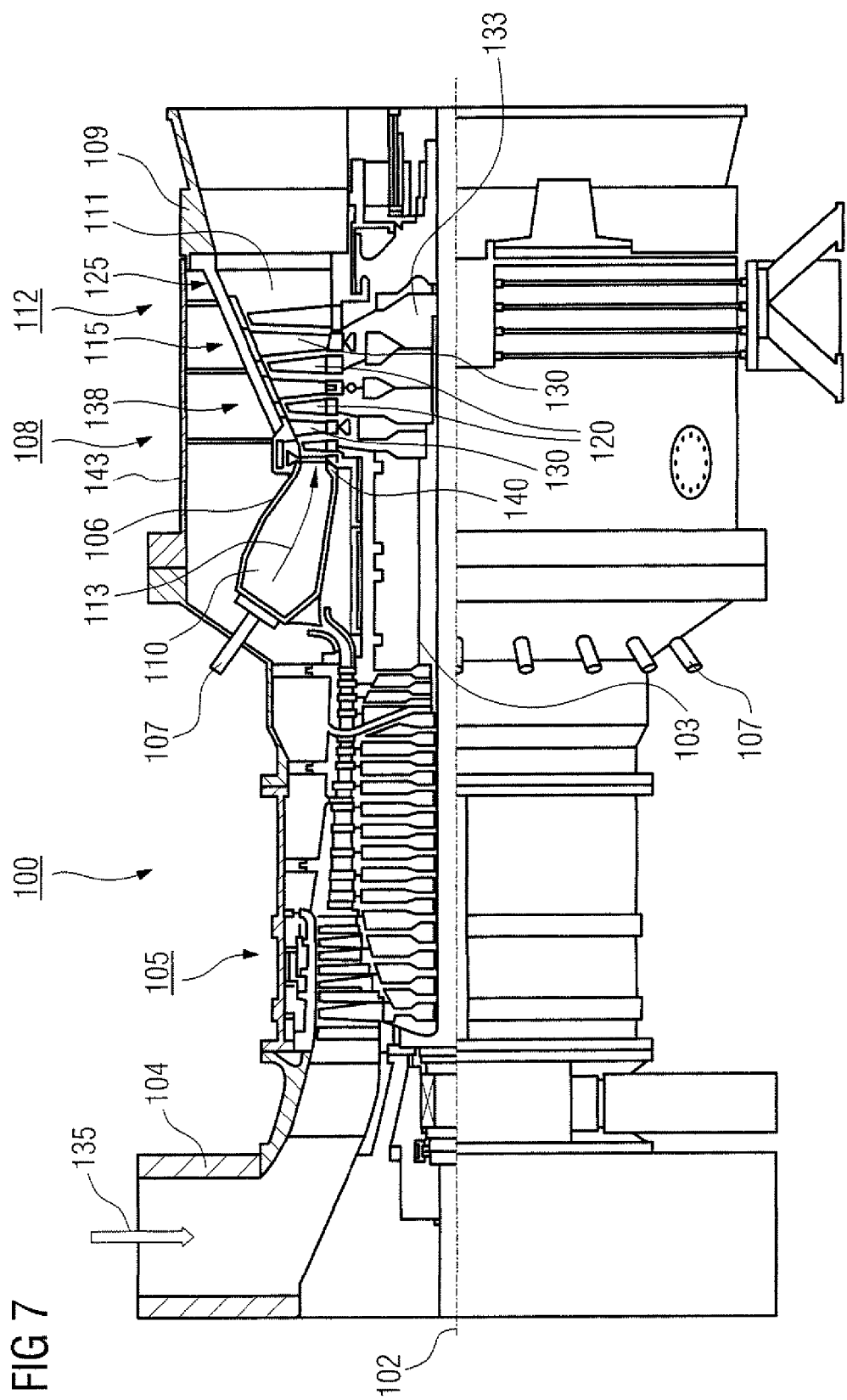
FIG. 7 shows a gas turbine.

FIG. 7 shows, by way of example, a partial longitudinal section through a gas turbine 100.

In the interior, the gas turbine 100 has a rotor 103 with a shaft which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 8:
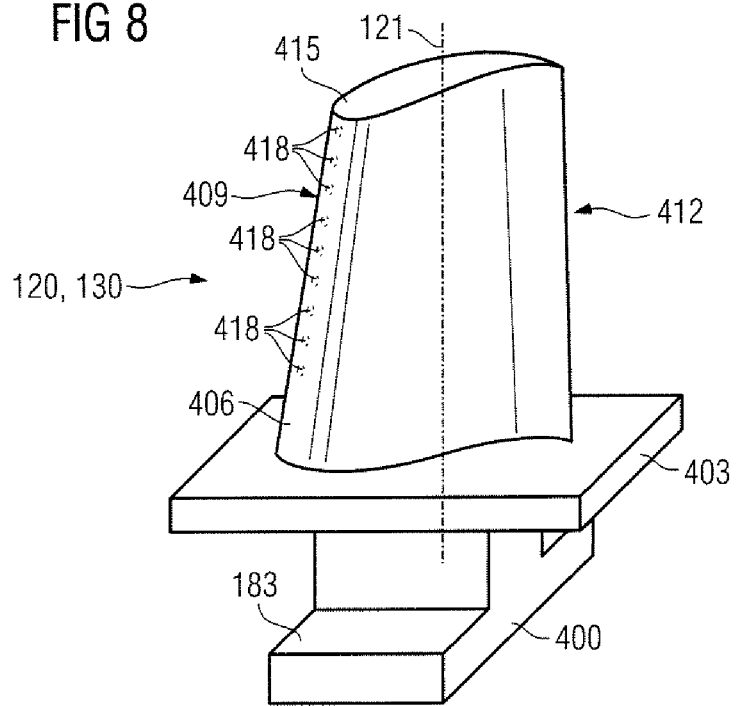
FIG. 8 shows a turbine blade or vane.

FIG. 8 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general teens to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1, which are intended to form part of this disclosure with regard to the chemical composition of the alloy.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

Figure 9:
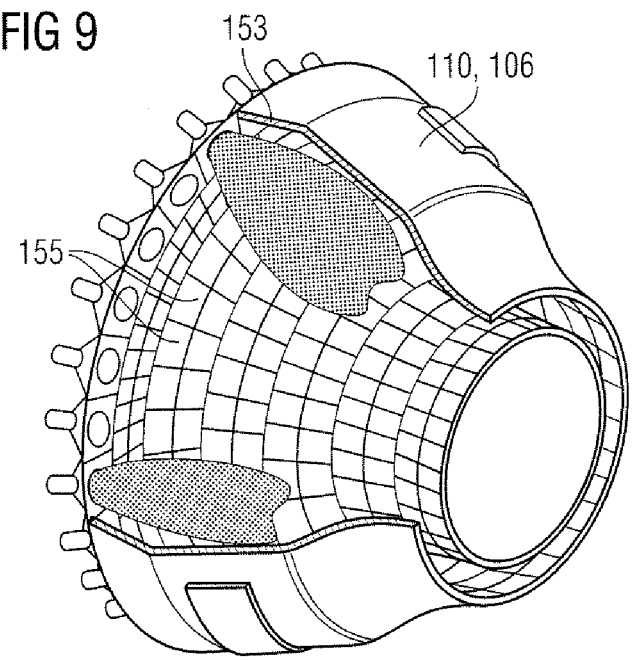
FIG. 9 shows a combustion chamber.

FIG. 9 shows a combustion chamber 110 of the gas turbine 100. The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1, which are intended to form part of this disclosure with regard to the chemical composition of the alloy.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from turbine blades or vanes 120, 130 or heat shield elements 155 (e.g. by sand-blasting). Then, the corrosion and/or oxidation layers and products are removed.

If appropriate, cracks in the turbine blade or vane 120, 130 or in the heat shield element 155 are also repaired. This is followed by recoating of the turbine blades or vanes 120, 130 or heat shield elements 155, after which the turbine blades or vanes 120, 130 or the heat shield elements 155 can be reused.

The invention claimed is:

1. A process for opening a plurality of cooling-air holes of cooling-air rows in a component, comprising:
   providing only a topmost and a bottommost hole in a row of more than the topmost and the bottommost holes with a masking material before the coating, wherein the topmost and the bottommost holes are not coated or are scarcely coated during a coating within the topmost and bottommost holes;
   coating the component including a plurality of open cooling-air holes in the row and the two uncoated masked holes wherein the plurality of open cooling-air holes are completely filled with coating and thus completely closed;

removing the masking material from the two uncoated masked holes after the coating;

aligning the two uncoated masked holes with respect to a line between the two holes after the coating; and reopening the plurality of coated open cooling-air holes by a machining machine using the alignment, wherein an actual alignment of all holes arranged in the row of holes is determined by the line between the two uncoated masked holes, which are not coated during the coating, in the row of holes, in order to determine a position of the coated open cooling-air holes.

2. The process as claimed in claim 1, wherein the topmost and the bottommost holes are cooling-air holes.

* * * * *